United States Patent

Watanuki

[15] 3,687,530
[45] Aug. 29, 1972

[54] APPARATUS FOR PROJECTING HEMISPHERICAL MOTION PICTURES

[72] Inventor: Toshio Watanuki, Tokyo, Japan

[73] Assignee: The Midori-Kai Co., Ltd., Osaka, Japan

[22] Filed: March 15, 1971

[21] Appl. No.: 123,997

[30] Foreign Application Priority Data

Nov. 30, 1970   Japan .................... 45/105695

[52] U.S. Cl. .................... 352/71, 352/133, 355/125
[51] Int. Cl. ............................................ G03b 37/04
[58] Field of Search ...... 352/71, 69, 70, 133; 353/30; 355/125; 350/117, 125

[56] References Cited

UNITED STATES PATENTS

| | | | |
|---|---|---|---|
| 2,610,544 | 9/1952 | Waller et al. | 352/71 X |
| 2,280,206 | 4/1942 | Waller et al. | 350/125 X |

FOREIGN PATENTS OR APPLICATIONS 298,615   1/1930   Great Britain .............. 352/71

*Primary Examiner*—Samuel S. Matthews
*Assistant Examiner*—Robert P. Greiner
*Attorney*—Dawson, Tilton, Fallon & Lungmus

[57] ABSTRACT

An apparatus for projecting hemispherical motion pictures includes a hemispherical screen truncated below its equator and a plurality of equidistantly spaced projectors positioned along the lower periphery of the screen. Each projector is positioned within a projection room having a projection window of generally triangular shape, and a mask is positioned over each window. Each mask has an opening which has substantially the same contour as the contour of the window but which is sized slightly smaller than the window to define a projection ray transmitting portion between the periphery of the projection window and the periphery of the mask opening.

5 Claims, 4 Drawing Figures

PATENTED AUG 29 1972       3,687,530

APPARATUS FOR PROJECTING HEMISPHERICAL MOTION PICTURES

BACKGROUND OF SUMMARY

This invention relates to an apparatus for projecting hemispherical motion pictures.

With an apparatus for projecting hemispherical motion pictures, the subject in the overall view all around and above which has been photographed simultaneously by a plurality of cinecameras with each segment thereof covered by each cinecamera is reproduced on the entire area of a hemispherical screen by the identical number of projectors. Accordingly, technical problems are encountered in presenting the images respectively projected on the screen by the projectors in the form of a continuous picture as a whole. One of the problems relates to the coordination of the adjacent segments of the picture. Needless to say, it is of extreme importance to avoid the occurrence of an intermediate blank between the adjacent segments of the picture covered by the respective projectors. In order to allow for the possible occurrence of blank portions sidewise of the picture, it may be preferred to present the adjacent segments of the picture slightly in overlapping relation to each other, which however consequently renders the overlapping portions darker in color than the other portions. Further it is inevitable that there exist difference in color tone between the segments of the picture covered by the respective projectors and the boundary of the adjacent segments, if it is distinct, renders the adjacent images contrasty in color tone, giving incongruous impression to the spectators.

In spite of the fact that segments of a picture are respectively projected by a plurality of projectors onto the entire area of a hemispherical screen simultaneously, the present invention makes possible projection of a continuous picture without giving incongruous feeling to the spectators.

The present invention will be described in greater detail with reference to the companying drawings.

DESCRIPTION OF SPECIFIC EMBODIMENT

Figure 1:
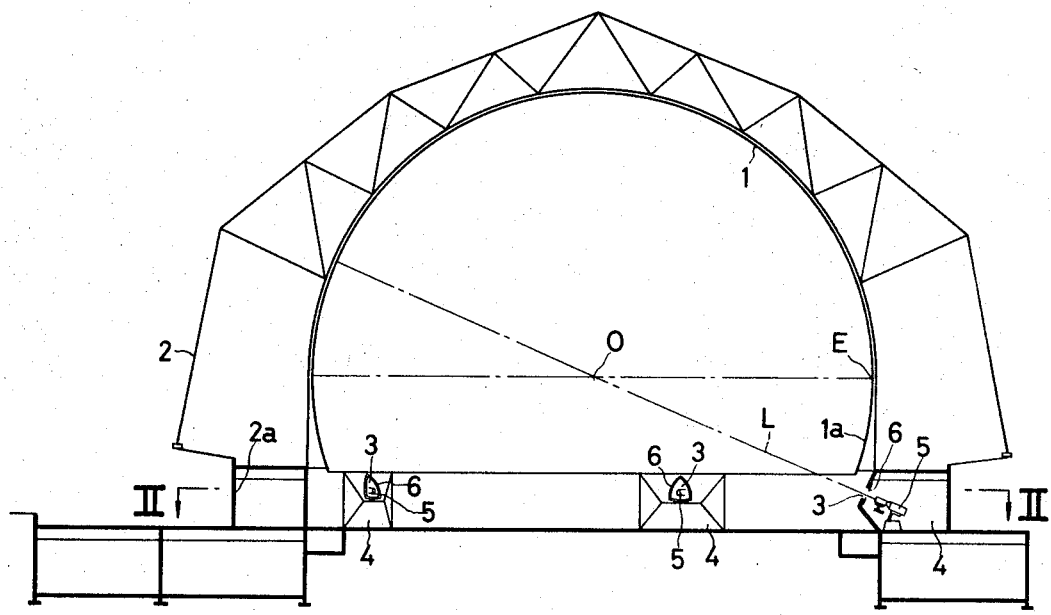
FIG. 1 is a view in vertical section showing the whole apparatus according to the present invention.
Figure 2:
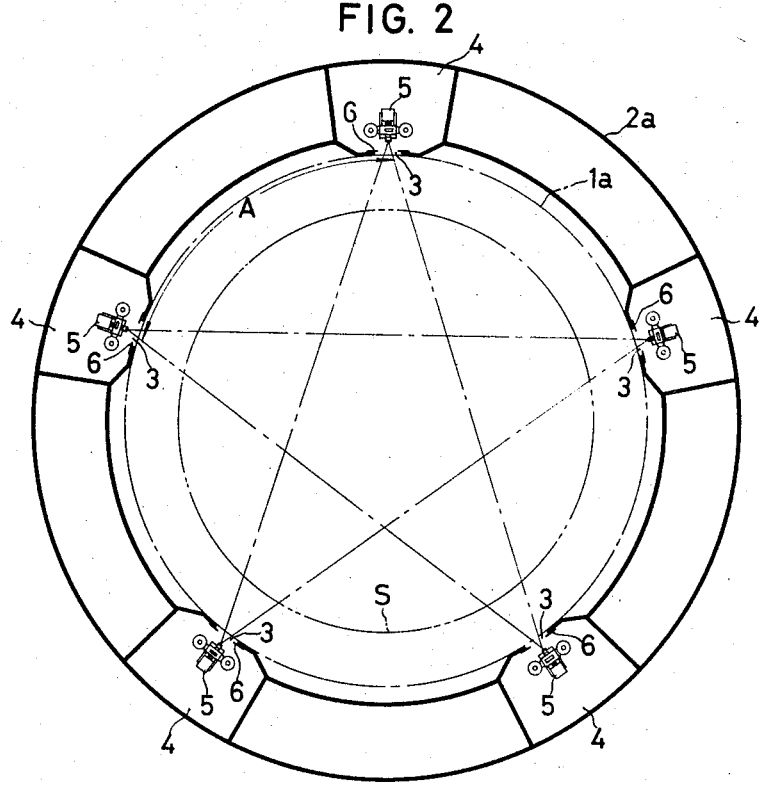
FIG. 2 is a sectional view taken along the line II—II in FIG. 1.

Referring to FIGS. 1 and 2, a screen 1 is in the form of a sphere which is truncated below the equator E and includes an arcuate lower extension 1a continuously extending downwardly below the equator E. The hemispherical screen 1 is fixed to a domelike building 2 surrounding the screen. Formed between the screen 1 and the building 2 is a space for accommodating a number of unillustrated sound systems. The annular lower portion 2a of the building 2 is provided with suitable entrances and exits (not shown) and five projection rooms 4 having projection windows 3 and equidistantly spaced apart. Installed in each of the projection rooms 4 is a motion-picture projector 5 of the horizontal film transport type equipped with an equidistance projection lens or three-dimensional image projection lens. The projector 5 is disposed at each corner of a regular pentagon and is so adjusted that its optical axis L passes through the center O of the sphere defining the screen 1. Each division A of the screen 1 which is vertically divided into five is covered by each projector 5. The projection window 3 resembles the division A in shape as it is seen in development. The space surrounded by the annular lower portion 2a of the building 2 and positioned below the screen 1 provides the place for the spectators. In order to make it easy for the spectators to watch the images projected on the screen 1, the place for the spectators is defined by a circle S indicated in two-dotted chain line in FIG. 2 which is concentric with and slightly smaller in diameter than the circle defined by the lower peripheral end of the screen 1. In accordance with this embodiment, five films are simultaneously projected on the screen by five projectors, but the number of the projectors is not critical and may be varied as desired.

Figure 3:
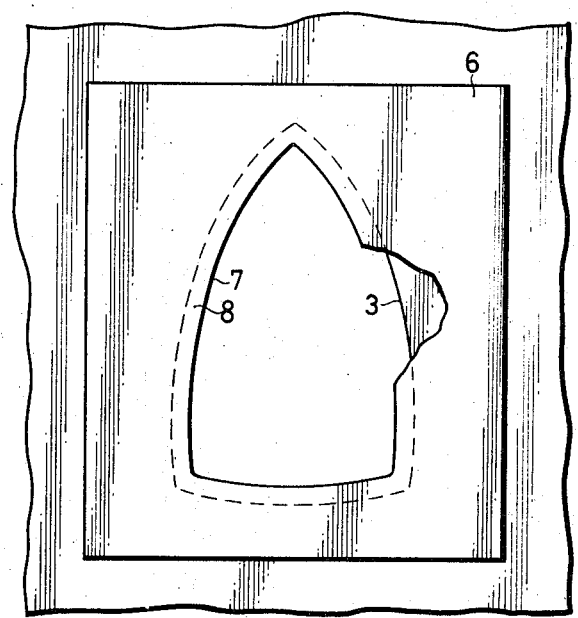
FIG. 3 is a front view with part broken away showing a projection window provided with a mark having no variations in density at ray transmitting portion.

Referring to FIG. 3, the projection window 3 is provided, on its inner side, with a mask 6 made of a semitransparent material and having an opening 7 which resembles the contour of the projection window 3 but is slightly smaller than the window. The part of the mask 6 defined by the inner periphery of the projection window 3 and the inner periphery of the opening 7 of the mask serves as a projection ray transmitting portion 8. The semitransparent material may preferably be a semitransparent film of synthetic resin. A strong paper such as a Japanese hand-made paper may also be used. To attach the mask 6 to the projection window 3, the mask 6 may be bonded to the wall of the projection room 4 with an adhesive, or it may be secured thereto with a suitable fixing member.

Figure 4:
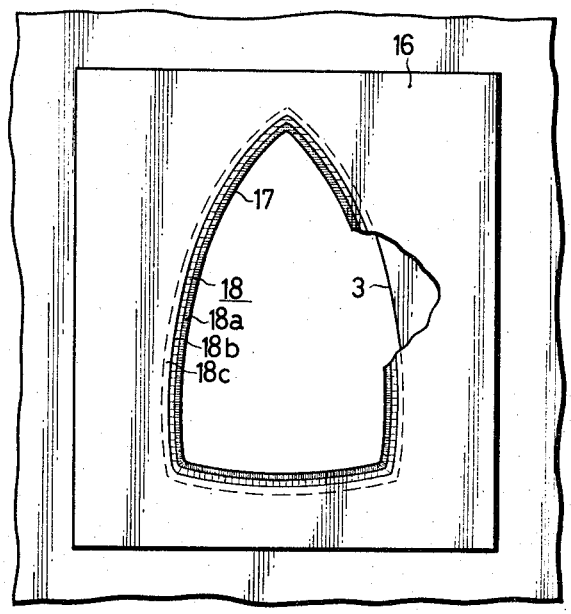
FIG. 4 is a front view with part broken away showing a projection window provided with a mask having variations in density ray transmitting portion.

FIG. 4 shows a mask 16 which is different from the mask 6 described above. The mask 16 is such that the transparency of the projection ray transmitting portion 18 thereof lowers toward the inner periphery of an opening 17, with the transparency gradually increasing toward the portion remote therefrom. More specifically, a first portion 18a along the inner periphery of the opening 17, though semitransparent, has a relatively high density. A second portion 18b externally surrounding the first portion 18a and a third portion 18c positioned further externally thereof and having the inherent transparency degree of the mask 16 is slightly lower than the second portion 18b in density. Such variation in transparency or in density may preferably be so gradual that the boundary between adjacent portions is indiscernible.

Although the area of the projection ray transmitting portion 8 or 18 of the illustrated masks 6 or 16 is invaribale, a mask divided into a suitable number of segments may be attached to the wall of the projection room 3 in movable manner, whereby the area of the projectionary transmitting portion can be controlled as desired. The provision of such mask makes it possible, where necessary, to eliminate the image to be projected in the vicinity of the boundary of the adjacent segments of a picture. By means of the masks usually provided for the projectors 5 and the projection windows 3, the rays to be projected on the screen 1 from the projectors 5 are confined to such shape that an overlapping portion is produced between the adjacent segments of the picture. Since the transmitting portion 8 of the mask 6 is semitransparent, the projected rays passing through this portion is reduced in brightness, so that the image corresponding to this portion looks vague. Consequently, the boundary portion between the adjacent segments of the picture on the screen becomes blurred, with the result that the presence of the boundary portion and dirrerence in color tone between the adjacent segment become indistinct.

I claim:

1. An apparatus for projecting hemispherical motion pictures comprising a truncated hemispherical screen, a plurality of projectors disposed below the equator of the screen and spaced apart adjacent the periphery of the screen, a projection room for each projector, each projection room having a projection window positioned forwardly of the associated projector, and a mask secured to each projection window, each mask being made of a semitransparent material and having an opening having substantially the same contour as the contour of the projection window and being sized slightly smaller than the window, each mask including a projection ray transmitting portion defined by the periphery of the projection window and the periphery of the opening in the mask and the transparency of the projection ray transmitting portion being greater adjacent the periphery of the projection window than adjacent the periphery of the opening in the mask.

2. The apparatus of claim 1 in which each projection window and each mask opening are generally triangular in shape with the apex thereof extending upwardly toward the equator of the screen, each projection window including three convex arcuate sides and each mask opening including three convex arcuate sides spaced inwardly from the sides of the associated window, the transparency of the projection ray transmitting portion of each mask gradually increasing from the periphery of each convex arcuate side of the mask opening toward the convex arcuate side of the window.

3. The apparatus of claim 1 in which the transparency of the projection ray transmitting portion gradually increases from the periphery of the opening in the mask toward the periphery of the projection window.

4. The apparatus of claim 1 in which the projection window and the mask opening are generally triangular in shape, the projection window including three convex arcuate sides, the mask opening including three convex arcuate sides spaced inwardly from the sides of the window.

5. The apparatus of claim 4 in which the apex of the triangularly shaped mask opening extends upwardly toward the equator of the screen.

* * * * *